US011619017B2

United States Patent
Li et al.

(10) Patent No.: US 11,619,017 B2
(45) Date of Patent: Apr. 4, 2023

(54) BARRAGE WITH FUNCTION OF COLLECTING FLOATING GARBAGE ON WATER SURFACE

(71) Applicant: LUDONG UNIVERSITY, Yantai (CN)

(72) Inventors: Xueyan Li, Yantai (CN); Zhi Cheng, Weifang (CN); Zhen Yu, Heze (CN); Zhenhua Zhang, Yantai (CN); Chunyi Xiu, Yantai (CN)

(73) Assignee: LUDONG UNIVERSITY, Yantai (TW)

( * ) Notice: Subject to any disclaimer, the term of this patent is extended or adjusted under 35 U.S.C. 154(b) by 0 days.

(21) Appl. No.: 17/572,663

(22) Filed: Jan. 11, 2022

(65) Prior Publication Data

US 2023/0065521 A1    Mar. 2, 2023

(30) Foreign Application Priority Data

Sep. 2, 2021 (CN) .......................... 202111024502.4

(51) Int. Cl.
*E02B 7/02* (2006.01)
*E02B 8/02* (2006.01)
*E02B 7/20* (2006.01)
*E02B 15/10* (2006.01)
*C02F 1/40* (2023.01)
*E02B 5/08* (2006.01)
(Continued)

(52) U.S. Cl.
CPC ................ *E02B 8/026* (2013.01); *C02F 1/40* (2013.01); *E02B 5/085* (2013.01); *E02B 7/02* (2013.01); *E02B 7/20* (2013.01); *E02B 15/104* (2013.01); *C02F 2103/007* (2013.01); *C02F 2201/009* (2013.01); *H02S 40/38* (2014.12)

(58) Field of Classification Search
CPC ... E02B 5/08; E02B 5/085; E02B 7/02; E02B 7/08; E02B 7/20; E02B 8/02; E02B 8/023; E02B 8/026
USPC ........... 210/160, 170.1, 400, 747.5; 405/107, 405/108, 116
See application file for complete search history.

(56) References Cited

U.S. PATENT DOCUMENTS

| 799,829 A | * | 9/1905 | Church | ..................... E02B 8/06 405/108 |
| 799,830 A | * | 9/1905 | Church | ..................... E02B 8/06 405/108 |

(Continued)

*Primary Examiner* — Christopher Upton
(74) *Attorney, Agent, or Firm* — WPAT, PC

(57) ABSTRACT

A barrage with a function of collecting floating garbage on a water surface is provided. It includes a first dam body as a main body of the barrage provided with multiple built-in low water level drainage channels and high water level drainage channels, a second dam body provided with multiple notches for converging floating garbage on the water surface, a garbage collecting and storing equipment arranged between the first dam body and the second dam body and a solar power generating equipment. The garbage collecting and storing equipment maintains running of the garbage conveyor belt by utilizing electric energy provided by the solar power generating equipment, thereby collecting garbage in a garbage pool beside the barrage. It not only has conventional functions of the barrage, but also greatly saves cost of manually salvaging garbage and avoids water pollution caused by accumulation of garbage on the river surface.

3 Claims, 2 Drawing Sheets

(51) Int. Cl.
    *H02S 40/38*     (2014.01)
    *C02F 103/00*    (2006.01)

(56)             References Cited

U.S. PATENT DOCUMENTS

| | | | | |
|---|---|---|---|---|
| 1,995,367 | A * | 3/1935 | Stewart | E02B 7/16 |
| | | | | 405/108 |
| 3,693,796 | A * | 9/1972 | Michel | E02B 8/023 |
| | | | | 210/170.1 |
| 3,854,291 | A * | 12/1974 | Perkins | E02B 8/023 |
| | | | | 210/170.1 |
| 4,253,952 | A * | 3/1981 | Grebb | B01D 29/6423 |
| | | | | 210/170.1 |
| 7,232,036 | B2 * | 6/2007 | Van Slyke | A01K 1/01 |
| | | | | 210/160 |
| 7,857,967 | B2 * | 12/2010 | Lee | E02B 8/02 |
| | | | | 210/170.04 |
| 2017/0370062 | A1 * | 12/2017 | Zhang | E02B 8/023 |
| 2018/0056213 | A1 * | 3/2018 | Inui | E02B 8/026 |
| 2018/0320356 | A1 * | 11/2018 | Wang | E02B 7/02 |

* cited by examiner

BARRAGE WITH FUNCTION OF COLLECTING FLOATING GARBAGE ON WATER SURFACE

TECHNICAL FIELD

The invention relates to the technical field of water conservancy engineering, particularly to a barrage with a function of collecting floating garbage on a water surface.

BACKGROUND

As the society is developing, environmental pollution is becoming increasingly serious. Whether in cities or villages, river garbage disposal is a headache. There is floating garbage often seen in the river channel, such as convenience bags, plastic bottles, foam plastics and so on. At present, the conventional manual salvage method is often used to deal with these river wastes, which is costly and inefficient.

The conventional barrage is singular in function, which only has the function of intercepting water flow and raising water level. For the increasingly serious water pollution, the conventional barrage does not play a positive role, but possibly causes the garbage on the river surface to gather at one side of the dam and aggravates the pollution.

SUMMARY

An objective of the invention is to provide a barrage with a function of collecting floating garbage on a water surface in order to overcome the shortcomings of the prior art.

According to the technical solution provided by the invention, the barrage with the function of collecting floating garbage on the water surface may include a first dam body, a second dam body, a garbage collecting and storing equipment and a solar power generating equipment.

The first dam body as the main body of the barrage is equipped with several built-in low water level drainage channels and high water level drainage channels; a side of the first dam body facing away from a water flow direction is inclined until a bottom thereof, and another side facing towards the water flow direction is inclined until upper edges of the low water level drainage channels; lower edges of the low water level drainage channels extend to a side of second dam body facing away from the water flow direction.

A top of the second dam body is provided with multiple overflow notches, and the multiple overflow notches are arranged along a direction perpendicular to the water flow direction; the side of the second dam body facing away from the water flow direction is vertically disposed until the lower edges of the low water level drainage channels; a groove is arranged at the side of the second dam body facing away from the water flow direction, and a netted conveying belt of the garbage collecting and storing equipment is installed in the groove.

The garbage collecting and storing equipment may include a driven wheel, a driving wheel with a driving motor, the netted conveyor belt, multiple fixed pillars and a garbage pool. an end of each of the multiple fixed pillars is fixedly connected to the first dam body, and another end of each of the multiple fixed pillars is fixedly connected into the groove at the side of the second dam body facing away from the water flow direction, the driven wheel and the driving wheel with the driving motor are respectively installed on the multiple fixed pillars, the netted conveyor belt is installed on the driving wheel with the driving motor and the driven wheel, the driving wheel with the driving motor is connected to a power storage box of the solar power generating equipment through a circuit, and the power storage box is configured for powering the driving wheel with the driving motor to rotate and thereby drive the driven wheel and the netted conveyor belt to rotate; and the garbage pool is located at a side of the second dam body and configured for collecting garbage through the extended netted conveyor belt.

The solar power generating equipment may include a solar panel, a support and the power storage box. The solar panel is fixed on a top of the first dam body by the support, the power storage box is located at the top of first dam body, and the power storage box is connected to the solar panel through the circuit.

In an embodiment, the netted conveyor belt adopts a fishnet-like structure.

In an embodiment, each of the low water level drainage channels is provided with a gate, and the gate is configured for being switchably opened or closed to store water at different water levels.

The invention has substantial characteristics and remarkable progress: 1. it not only has the function of the conventional barrage, but also has a certain river water purifying function, thus protecting the river environment; 2. two kinds of drainage channels in different heights are arranged: the low water level drainage channels, intended for rainy seasons with sufficient rainfall and the high water level drainage channels, intended for dry season with little rainfall to ensure sufficient water quantity; 3. the top surface of first dam body may be provided with a traffic lane, which is connected with the highway to facilitate transport, while the top surface of second dam body may be designed as a recreational fishing ground for the purpose of economic benefits; 4. the barrage with the function of collecting garbage on water surface has advantages of a simple structure, good integrity, high utilization rate and easy use.

Figure 1:
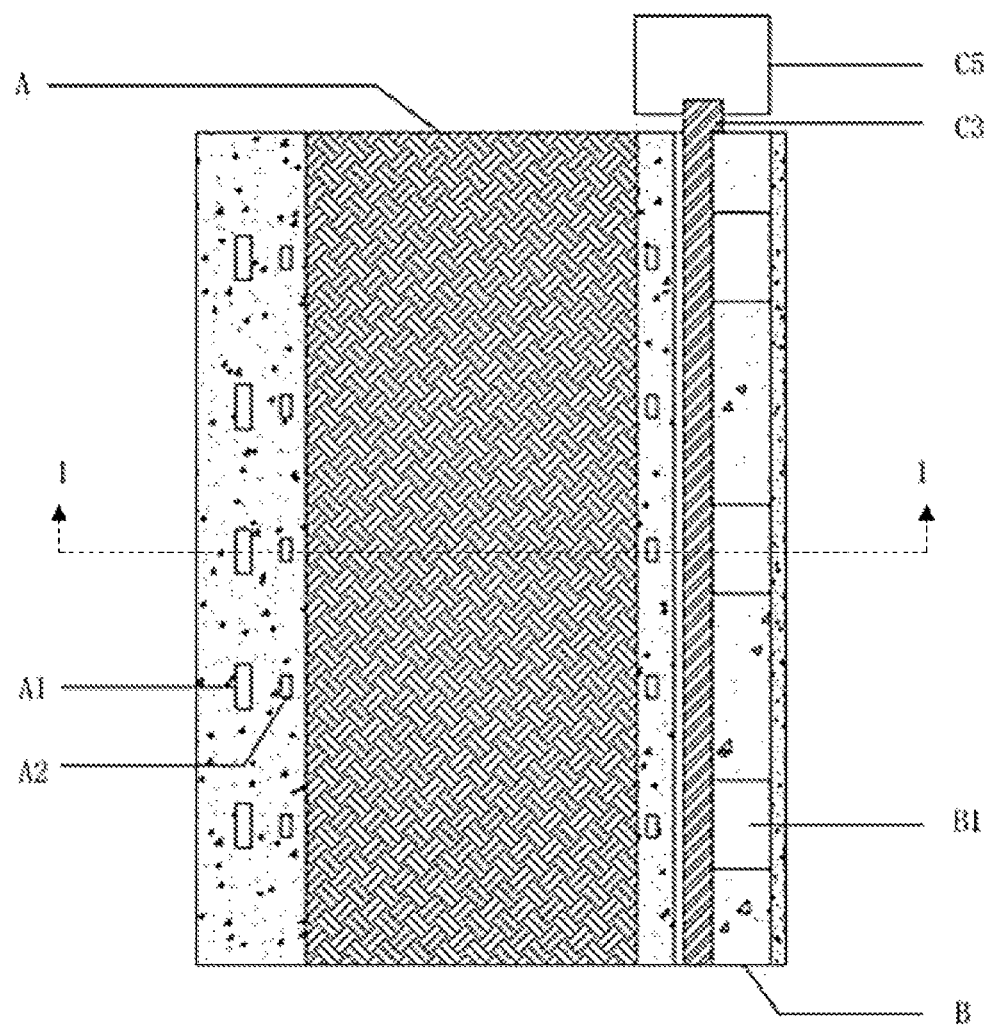
FIG. 1 is a schematic top view of an overall structure of a barrage of the invention.

In the drawings: A: first dam body, A1: low water level drainage channel, A2: high water level drainage channel, A3: gate, B: second dam body, B1: overflow notch, C: garbage collecting and storing equipment, C1: driven wheel, C2: driving wheel with driving motor, C3: netted conveyor belt, C4: fixed pillar, C5: garbage pool, D: solar power generating equipment, D1: solar panel, D2: support, and D3: power storage box.

DETAILED DESCRIPTION OF EMBODIMENTS

In order to facilitate further understanding of the content, characteristics and functions of the invention, the detailed description is provided as follows with the accompanying drawings.

Figure 2:
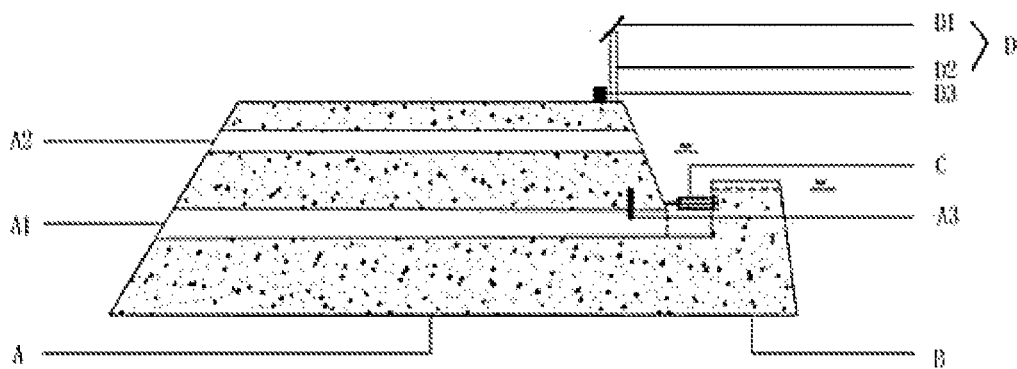
FIG. 2 is a schematic structural cross-sectional view of the barrage taken along the line 1-1 in FIG. 1.
Figure 3:
FIG. 3 is a schematic structural front view of a water facing surface of the barrage.
Figure 4:
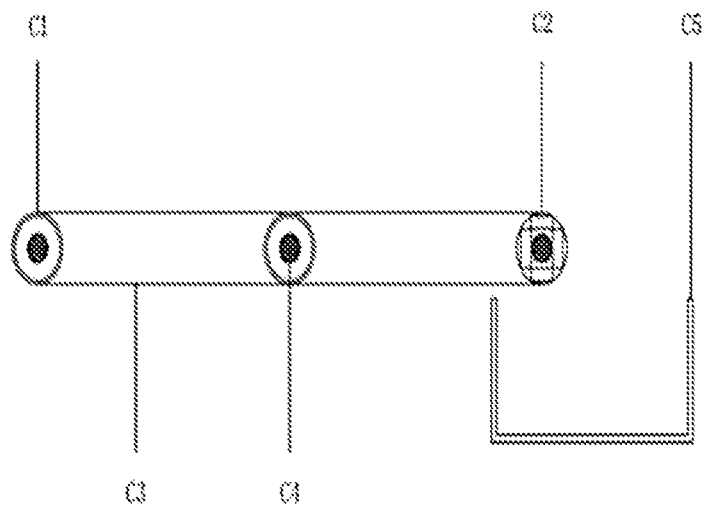
FIG. 4 is a schematic structural diagram of a garbage collecting and storing equipment of the invention.

As shown in FIG. 1-FIG. 4, a barrage with a function of collecting floating garbage on a water surface may include a first dam body A, a second dam body B, a garbage collecting and storing equipment C and a solar power generating equipment D. The first dam body as the main body of the barrage is equipped with several built-in low water level drainage channels A1 and high water level drainage channels A2 and the low water level drainage channels are provided with a gate for storing water at different levels by opening and closing the gate. A top of second dam body B is provided with multiple overflow notches B1, and the multiple overflow notches B1 are arranged on the top of second dam body B. The garbage collecting and storing equipment C may include a driven wheel C1, a driving wheel C2 with a driving motor, a netted conveyor belt C3, fixed pillars C4 and a garbage pool C5. The solar power generating equipment may include a solar panel D1, a support D2 and a power storage box D3;

A side of the first dam body A facing away from a water flow direction is inclined until a bottom thereof at a certain angle, and another side facing towards the water flow direction is inclined until upper edges of the low water level drainage channels A1 at a certain angle. Lower edges of the low water level drainage channels A1 extend to the side of second dam body B facing away from the water flow direction. A top of second dam body B is provided with the multiple overflow notches B1, which are used to speed up water flow and make it easier to collect floating garbage. The side of the second dam body B facing away from the water flow direction is vertically disposed until the lower edges of the low water level drainage channels A1, a groove is arranged at the side of the second dam body B facing away from the water flow direction, and the netted conveying belt for the garbage collecting and storing equipment C is installed in the groove. There are multiple fixed pillars C4, with one end of each of the multiple fixed pillars C4 being fixedly connected to the first dam body A, and the other end of each of the multiple fixed pillars C4 being fixedly connected into the groove at the side of the second dam body B facing away from the water flow direction. The driven wheel C1 and the driving wheel C2 with the driving motor are installed on the multiple fixed pillars C4, the netted conveyor belt C3 is installed on the driving wheel C2 with the driving motor and the driven wheel C2, the driving wheel C2 with the driving motor is connected to the power storage box D3 of the solar power generating equipment D through a circuit, so that the power supply of the power storage box D3 makes the driving wheel C2 with the driving motor rotate and drives the driven wheel C1 and the netted conveyor belt C3 to rotate; the netted conveyor belt C3 adopts a fishnet-like structure. The garbage pool C5 is located at a side of the second dam body B for collecting garbage through the extended netted conveyor belt C3. The solar panel D1 is fixed on a top of the first dam body A by the support D2 to collect solar energy; the power storage box D3 is located at the top of first dam body A, which is connected to the solar panel D1 through a circuit and is designed for storing electric energy.

The barrage with the function of collecting floating garbage in the invention, in which the first dam body acts as the main body of the barrage, several overflow notches at the top of the second dam body are used for converging floating garbage on the water surface, and the garbage collecting and storing equipment between the first dam body and the second dam body maintains the rotation of the garbage conveyor belt by utilizing the electric energy provided by the solar power generating equipment, thereby achieving the purpose of collecting garbage in the garbage pool beside the barrage; while giving full play to the conventional functions of the dam itself, such as blocking and storing water, the barrage with the function of collecting floating garbage greatly saves the cost of manually salvaging river garbage and avoids water pollution caused by garbage accumulation on the river surface.

The above is only the illustrated embodiment of the invention, and the scope of protection of the invention is not limited to the above embodiment, but all technical solutions under the idea of the invention belong to the scope of protection of the invention. It should be pointed out that for ordinary technicians in the technical field, several improvements and embellishments without departing from the principles of the invention should also fall into the scope of protection of the invention.

What is claimed is:

1. A barrage with a function of collecting floating garbage on a water surface, comprising:
    a first dam body,
    a second dam body,
    a garbage collecting and storing equipment, and
    a solar power generating equipment;
    wherein the first dam body as a main body of the barrage is equipped with several built-in low water level drainage channels and high water level drainage channels; a side of the first dam body facing away from a water flow direction is inclined until a bottom thereof, and another side facing towards the water flow direction is inclined until upper edges of the low water level drainage channels; lower edges of the low water level drainage channels extend to a side of the second dam body facing away from the water flow direction;
    wherein a top of the second dam body is provided with a plurality of overflow notches, and the plurality of overflow notches are arranged along a direction perpendicular to the water flow direction; the side of the second dam body facing away from the water flow direction is vertically disposed until the lower edges of the low water level drainage channels; a groove is arranged at the side of the second dam body facing away from the water flow direction, and a netted conveying belt of the garbage collecting and storing equipment is installed in the groove;
    wherein the garbage collecting and storing equipment comprises a driven wheel, a driving wheel with a driving motor, the netted conveyor belt, a plurality of fixed pillars and a garbage pool; an end of each of the plurality of fixed pillars is fixedly connected to the first dam body, and the other end of each of the plurality of fixed pillars is fixedly connected into the groove at the side of the second dam body facing away from the water flow direction; the driven wheel and the driving wheel with the driving motor are installed on the plurality of fixed pillars, the netted conveyor belt is installed on the driving wheel with the driving motor and the driven wheel, the driving wheel with the driving motor is connected to a power storage box of the solar power generating equipment through a circuit, and the power storage box is configured for powering the driving wheel with the driving motor to rotate and thereby drive the driven wheel and the netted conveyor belt to rotate; and the garbage pool is located at a side of the second dam body and configured for collecting garbage through the extended netted conveyor belt; and
    wherein the solar power generating equipment comprises a solar panel, a support and the power storage box; the solar panel is fixed on a top of the first dam body by the support, the power storage box is located at the top of first dam body, and the power storage box is connected to the solar panel through a circuit.

2. The barrage with the function of collecting floating garbage on the water surface according to claim 1, wherein the netted conveyor belt adopts a fishnet-like structure.

3. The barrage with the function of collecting floating garbage on the water surface according to claim 1, wherein a gate is arranged in each of the low water level drainage channels and configured for being switchably opened or closed to store water at different levels.

\* \* \* \* \*